United States Patent Office 3,222,386
Patented Dec. 7, 1965

3,222,386
PREPARATION OF ORGANIC ISOCYANATES
Thomas H. Cleveland, New Martinsville, W. Va., assignor to Mobay Chemical Company, Pittsburgh, Pa., a corporation of Delaware
No Drawing. Filed Jan. 2, 1962, Ser. No. 163,865
2 Claims. (Cl. 260—453)

This invention relates to the preparation of organic isocyanates and more particularly to an improved method of making an organic isocyanate from an amine and phosgene.

It has been proposed heretofore to prepare organic isocyanates by reacting phosgene with an amine. In many of these processes a slurry is formed in a primary phosgenation step and then a second phosgenation step is employed to convert the initial prepared carbamyl chloride and amine hydrochloride to organic isocyanate. To operate satisfactorily, the primary phosgenation step must be carried out in a dilute solution of the amine and phosgene. Other processes also operate better with dilute solutions. The dilute solutions give higher yields of the organic isocyanate but suffer from the disadvantage that the solvent must be separated from the isocyanate produced in the second phosgenation step by fractional distillation in many cases. Fractionation or other expensive distillation steps are necessary to economically isolate the isocyanate. Also the excess phosgene used must be recovered and recycled to the primary phosgenator. Moremover, the excess solvent and high excess of phosgene is only needed for the initial mixing phase and need not be present for the balance of the process.

It is therefore an object of this invention to provide an improved process for the preparation of organic isocyanates. A further object of this invention is to provide a method of improving the yield of organic isocyanates obtained by reacting phosgene with an amine. Another object of this invention is to provide a method for making an organic isocyanate from an amine and phosgene without a prolonged primary phosgenation step and which minimizes the necessity of expensive distillation of the solvent from the isocyanate produced in the second phosgenation step. A further object of the invention is to provide a method for making an organic isocyanate which is adaptable to give a higher yield for any given throughput with distillation equipment of a given size in a given phosgene recovery system.

The foregoing objects and others which will become apparent from the following description are accomplished in accordance with the invention, generally speaking, by providing a process for the preparation of an organic isocyanate in which an amine, preferably either in solution or suspension in an inert solvent, is contacted with excess phosgene, the ratio of solvent to amine or phosgene to amine being at least about 15:1 by weight to form a carbamyl chloride-amine hydrochloride slurry and subsequently concentrating the slurry prior to conversion to an isocyanate. The process of the invention, therefore, involves reacting preferably a solution of an amine, but molten amaine may be used, with phosgene, preferably in a high speed mixer in a first step, removing a portion of the solvent used in the first step and then reacting the carbamyl chloride-amine hydrochloride slurry produced in the first step with additional phosgene, if desired, in a second step at an elevated temperature to produce an organic isocyanate.

In practicing the process of the invention, care must be taken to insure that the amount of phosgene present in the reaction mixture is at all times sufficient to react with the amine. Large excesses are best. In order to insure this, it is preferable to use from about 10 percent to about 600 percent excess phosgene over that required to react with the amine. It is preferred to combine the phosgene and the amine at such a temperature that the exothermic reaction occurring when these two components are combined should not raise the temperature of the reaction mixture substantially above about 90° C. Thus, it is preferred to introduce the fresh phosgene in solution to a high speed mixer at a temperature between about −20° C. and about 20° C. while the amine is in solution and at a temperature within the range of from about the solubility point to about 130° C. The essentially solids free phosgene rich solution is then recycled to the intial reaction zone. The slurry of carbamyl chloride-amine hydrochloride from the high speed mixer, for example, should preferably not be concentrated beyond a point where it will flow easily. For economical purposes a concentration sufficient to reduce the solvent by 50 percent or more is desirable.

If liquid phosgene is used per se instead of a solution of phosgene, then some of the excess phosgene may be separated from the initial slurry in the same way as the solution rich in phosgene, and either returned to separate phosgene feed or recycled separately.

Any suitable high speed mixer is contemplated by a preferred embodiment of the invention, such as, for example, turbomixers, colloid mills, pumps including centrifugal pumps, and the like which contain structure elements which rotate at high speeds and thus insure intimate contact between the amine and phosgene within a relatively short period of time. Preferably, the high speed mixer should be one which rotates at a speed of about 100 r.p.m. or more.

In one preferred embodiment of the process of this invention, a solution of phosgene and a solution of aromatic amine are introduced through separate conduits into a high speed mixer in such proportions that the weight ratio of all of the solvent (including that recycled) to amine is within the range of from about 20:1 to about 50:1. The reactants remain in this mixer for only a few seconds and are fed into a suitable concentrator such as, for example, a hydroclone, a centrifuge, a decantor or other suitable separator which serves to separate the slurry and send forward two streams. One stream is essentially a solid free solution and the other is a concentrated slurry having the desired solvent to amine ratio which is preferably within the range of about 5:1 to about 25:1 and most preferably within the range of from about 10:1 to about 15:1. The essentially solid free solution rich in phosgene is recycled to the high speed mixer and introduced therein together with the fresh phosgene solution and fresh amine solution. The concentrated slurry is fed to a suitable vessel where the reaction mixture is heated to a temperature of at least about 78° C. and preferably at least about 100° C. and more phosgene is added, if desired, to complete conversion to the isocyanate. Considerable saving is realized from this embodiment of the invention since much of the solvent and excess phosgene is removed prior to formation of all of the isocyanate without the necessity of distilling them from the product.

Although the temperature in the hot phosgenation is preferably maintained between a temperature of about 100° C. to about 200° C., a high temperature of up to about 300° C. or more which is below the decomposition temperature of the isocyanate may be used. If the temperature is above the boiling point of the solvent (which may be phosgene), equipment suitable for operating under pressure must be provided.

The invention is most advantageous if the hot phosgenation is effected continuously. By concentrating the slurry after formation at a high solvent to amine ratio, the yield advantage of the latter is obtained without decreased capacity for a given reaction time. To be more specific, if a stream from a cold phosgenation step having a solvent to amine ratio of 20:1 is concentrated to a solvent to amine ratio of 10:1, it will require a reaction vessel only half as large. Thus, the throughput for any given size apparatus is doubled. Furthermore, it has been found that the time required for complete reaction is less for slurries formed at higher dilution; therefore, operation in this manner instead of processing throughout at a given solvent to amine ratio provides benefit of both decreased reaction time and increased yield.

The invention may be practiced in preparing any aromatic, alicyclic or acyclic monoisocyanate or polyisocyanate from the corresponding amine. Examples of isocyanates which may be prepared include ethyl isocyanate from ethylamine, propyl isocyanate from propylamine, cyclohexyl isocyanate from cyclohexylamine, 2-naphthyl isocyanate from 2-naphthylamine, p-chlorophenyl isocyanate from p-chloroaniline, dichlorohexamethylene diisocyanate from dichlorohexamethyleneamine, hexyl isocyanate from hexylamine, octyl isocyanate from octylamine, dodecyl isocyanate from dodecylamine, octadecyl isocyanate from octadecylamine, tetramethylene diisocyanate from tetramethylenediamine, pentamethylene diisocyanate from pentamethylenediamine, hexamethylene diisocyanate from hexamethylenediamine, octamethylene diisocyanate from octamethylenediamine, undecamethylene diisocyanate from undecamethylene diamine, dodecamethylene diisocyanate from dodecamethylene diamine, 3,3'-diisocyanato-dipropylether from 3,3'-diamino-dipropylether etc.; cyclohexyl isocyanate from cyclohexylamine, tetrahydro-alpha-naphthyl isocyanate from tetrahydro-alpha-naphthylamine, tetrahydro-beta-naphthyl isocyanate from tetrahydrobeta-naphthylamine, etc.; xylylene diisocyanates from xylylenediamines, diphenylmethane-4,4'-diisocyanate from diphenylmethane-4,4'-diamine, beta-beta-diphenyl-propane - 4,4' - diisocyanate from beta-beta-diphenylpropane-4,4'-diamine, etc.; benzyl isocyanate from benzylamine, phenylethyl isocyanate from phenylethylamine; p-isocyanato benzyl isocyanate from p-aminobenzylamine, etc.; phenyl isocyanate from aniline, o-chlorophenyl isocyanate from o-chloroaniline, m-chlorophenyl isocyanate from m-chloroaniline, p-ethoxyphenyl isocyanate from p-ethoxyphenylamine, p-methoxyphenyl isocyanate from p-anisidine, p-cetyl phenyl isocyanate from p-cetylaniline; p-dodecylphenyl isocyanate from p-dodecylaniline, 5-dodecyl-2-methylphenyl isocyanate from 5-dodecyl-o-toluidine, 3-nitro-4-dodecylphenyl isocyanate from 3-nitro-4-dodecyl aniline; p-cetyloxyphenyl isocyanate from p-cetyloxyaniline; meta-phenylene diisocyanate from meta-phenylene diamine, p-phenylene diisocyanate from p-phenylene diamine, 2,4-toluylene diisocyanate from 2,4-toluylene diamine, naphthylene-1,4-diisocyanate from naphthylene-1,4-diamine, 2,6-toluylene diisocyanate from 2,6-toluylene diamine, 1,3,5-benzene triisocyanate from 1,3,5-benzene triamine, 2,4,4'-triisocyanatodiphenylether from 2,4,4'-triaminodiphenyl ether etc.; tetrahydrofurfuryl isocyanate from tetrahydrofurfurylamine, furfurylidene diisocyanate from furfurylidene diamine and the like.

The phosgene may be initially added to the liquid containing the amine either as liquid phosgene or as a solution in a suitable inert organic solvent. Any suitable organic solvent which is inert to the amine, to the resulting isocyanate and to phosgene may be used. Thus, suitable solvents are, for example, those which have the formula

wherein R is the same or different and is lower alkyl, hydrogen, halogen, nitro, aryloxy, alkoxy, as well as hydrocarbons, ethers, esters, and the like. Any suitable lower alkyl group may be used and those which contain from 1 to 4 carbon atoms are preferred such as, for example, methyl, ethyl, propyl, isopropyl, butyl, tertiary butyl as well as alkylene radicals yielding fused ring systems, for example, a butylene radical as in indene and the like. Any suitable halogen may be used such as, for example, chlorine, bromine, iodine, fluorine and the like. Any suitable aryloxy radical may be used such as, for example, phenoxy, cresoxy, ethylphenoxy and the like. Any suitable alkoxy radical may be used such as, for example, ethoxy, methoxy, propoxy, butoxy and the like. Furthermore, mixtures of hydrocarbons such as kerosene may be used. Examples of specific compounds are benzene, toluene, xylene, chlorobenzene, o-dichlorobenzene, tetrahydronaphthylene, 2,4-dichlorotoluene, 4,4'-dichlorodiphenyl, nitrobenzene, cyclohexane, durene, o-, m-, p-cumenes, dodecyl naphthylene ethyl acetate, diphenyl and the like. It is preferred to use aromatic hydrocarbons in the process of the invention and the best results are obtained when using xylene. Likewise, any suitable inert organic solvent including those just mentioned may be used for forming the solution or suspension of amine. The amount of amine and phosgene in the solution or suspension may be varied over a wide range without adversely affecting the yield to the extent that the yield is affected by similar variation in heretofore known cold phosgenations.

It is preferred to use a continuous centrifugal decantor as the separator. A hydroclone may be used but then sufficient pumping facilities must be included in the line leading to the high speed mixer to operate the hydroclone. A hydroclone having a diameter of only about 1⅛" and a length of only about 6" may be incorporated into a facility designed to produce thousands of pounds of isocyanate per day and accomplish the necessary separation of the solvent from the slurry which is discharged from the high speed mixer. It is often desirable to include a heat exchanger in the recycle phosgene line to adjust the temperature of the recycle phosgene solution so that the temperature of the solution coming from the high speed mixer remains within the range of from about 0° C. to about 90° C. and preferably between about 40° C. and about 70° C.

The invention is further illustrated by the following examples in which the parts are by weight unless otherwise indicated.

*Example 1*

A solution of 2,4-toluylene diamine in xylene having a concentration of about 15 pounds amine to about 150 pounds solvent is pumped through a centrifugal pump at the rate of about 165 pounds solution per minute and liquid phosgene at a temperature of about 0° C. is added simultaneously to the pump at the rate of about 53 pounds per minute. The temperature of the toluylene diamine solution is about 75° C. as it enters the pump. The reaction mixture from the pump flows continuously into a centrifugal decantor where the concentrated slurry of solids is separated and passed into a vessel having a stirrer where the reaction mixture is heated to a temperature of about 165° C. for about 3 hours while adding phosgene; the essentially solids free solution from the centrifugal decantor is recycled and pumped back into the centrifugal pump at a rate of about 231 pounds of solution per minute containing about 15 percent by weight of phosgene. The solvent to amine ratio in the centrifugal pump is about 23:1 and the solvent to amine ratio in the solids which are further reacted with phosgene is about 10:1, the balance being recycled as set forth above. The yield of 2,4-toluylene diisocyanate is about 96 percent.

*Example 2*

A solution of 80 percent 2,4- and 20 percent 2,6-toluylene diamine in xylene at about 80° C. having a concentration of about 30 grams amine in about 300 grams solvent is pumped through a centrifugal pump at a rate of about 330 grams per minute. Simultaneously, a solution of phosgene in xylene (about 13.5 percent phosgene) at 25° C. is added to the pump at a rate of about 903 grams per minute. The reaction slurry is divided into two approximately equal portions. One is allowed to settle by gravity and about 50 percent by volume of a clear liquid is decanted off. This slurry and the untreated "control" portion of the original slurry are each hot phosgenated at reflux and distilled to determine the yield of toluylene diisocyanate. Approximately 92 percent yields are obtained in both cases.

*Example 3*

A solution containing p-chlorophenyl amine dissolved in monochlorobenzene in a ration of about 15 pounds p-chlorophenyl amine per 150 pounds monochlorobenzene is pumped through a centrifugal pump at a rate of about 165 pounds per minute. Phosgene is added to the pump simultaneously at the rate of about 13 pounds per minute. The phosgene has been cooled to about 0° C. to liquefy it before it is added to the pump. The temperature of the amine solution is about 75° C. The reaction mixture from the pump flows continuously into a centrifugal decantor where the solids are concentrated and fed into a vessel having a stirrer where the reaction mixture is heated to a temperature of about 130° C. for about 3 hours while adding phosgene and the solid free phosgene solution from the centrifugal decantor is recycled and pumped back into the centrifugal pump at a rate of about 212 pounds per minute (about 8 percent phosgene). The solvent to amine ratio in the centrifugal pump is about 23:1 and the solvent to amine ration in the solids which are further reacted with phosgene is about 10:1, the balance being recycled as set forth above. The p-chlorophenyl isocyanate is recovered in good yield.

*Example 4*

A slurry of 4,4'-diamino diphenyl methane in monochlorobenzene having a concentration of about 20 pounds in about 80 pounds of monochlorobenzene at about 0° C. is pumped into a turbine mixer at a rate of about 100 pounds per minute. Simultaneously, a solution of phosgene in monochlorobenzene (about 11.5 percent phosgene) at 25° C. is pumped at a rate of about 1040 pounds per minute to the turbine mixer. The slurry is concentrated in a continuous centrifugal decantor from a solvent to amine weight ratio of about 50:1 to a solvent to amine weight ratio of about 15:1. The balance of the phosgene solution is recycled to the phosgene solution feed line. A good yield is obtained in the usual manner.

*Example 5*

Aniline at about 0° C. is pumped into a centrifugal pump at a rate of about 1.6 pounds per minute. Liquid phosgene is added to the pump at about 0° C. and about 50 pounds per minute. The resulting slurry is centrifuged and the concentrated slurry (about 15:1 solvent to amine ratio) is further processed with solvent to yield phenyl isocyanate. The excess phosgene from the centrifuge is recycled through a cooler to the liquide phosgene stream feeding the reactor.

*Example 6*

A solution of about 80 percent 2,4-toluylene diamine and about 20 percent 2,6-toluylene diamine in xylene at about 90° C. having a concentration of about 50 percent amine by weight is fed into a centrifugal pump at a rate of about 500 grams per minute. Simultaneously a phosgene solution in xylene comprising a mixture of liquid phosgene and recycle phosgene solution prepared in a phosgene solution tank is fed to the pump at a rate of about 1020 grams per minute (about 24 percent phosgene) at about 0° C. The resulting slurry is fed to a continuous solid bowl centrifuge discharging a clear filtrate and wet solids. The solids are processed as is or reslurried to an about 10 percent solids basis with a stream of decanted filtrate. The remainder of the filtrate is either recycled to the phosgene solution tank through a cooler or treated separately to adjust phosgene and/or isocyanate content. A yield of about 97 percent based on amine is obtained.

Although the invention has been described in considerable detail in the foregoing, it is to be understood that such detail is solely for the purpose of illustration and that variations can be made by those skilled in the art without departing from the spirit and the scope of the invention except as set forth in the claims. It is also to be understood that the foregoing working examples are given only for the purpose of illustration and that any other suitable organic solvent, amine, isocyanate, separating or mixing equipment and the like could be used if the teachings of this disclosure were followed. Moreover, the isocyanates produced by the process of this invention are useful for the preparation of both solid and non-porous polyurethane plastics which are in turn useful for the preparation of cushions, gear wheels and the like. Other isocyanates are useful for the preparation of insecticides and the like.

What is claimed is:

1. In a process for the preparation of an organic isocyanate selected from the group consisting of aromatic isocyanates having 1 to 2 benzene rings and aliphatic isocyanates having up to 18 carbon atoms in which the corresponding amine is reacted with excess phosgene in a primary phosgenation step to form a carbamyl chloride-amine hydrochloride slurry at a temperature below the decomposition point of said carbamyl chloride-amine hydrochloride and the slurry from the primary phosgenation step is heated in a second phosgenation step to a temperature above the decomposition point of said carbamyl chloride-amine hydrochloride up to about 300° C. to form the corresponding isocyanate, the improvement which comprises employing a solvent to amine ratio in said primary phosgenation step of from about 15:1 to about 50:1, removing a substantial portion of said solvent and excess phosgene prior to said second phosgenation step and recycling the removed excess solvent and phosgene to the primary phosgenation step.

2. The process of claim 1 wherein the solvent to amine ratio, based on the initial amine, is below the initial solvent to amine ratio in the second phosgenation step and is within the range of from about 5:1 to about 25:1 in the second phosgenation step.

References Cited by the Examiner
UNITED STATES PATENTS

| | | | |
|---|---|---|---|
| 2,683,160 | 7/1954 | Irwin | 260—453 |
| 2,908,704 | 10/1959 | Skiles | 260—453 |

FOREIGN PATENTS

| | | |
|---|---|---|
| 827,376 | 2/1960 | Great Britain. |

CHARLES B. PARKER, *Primary Examiner.*

IRVING MARCUS, *Examiner.*